Figure 6:
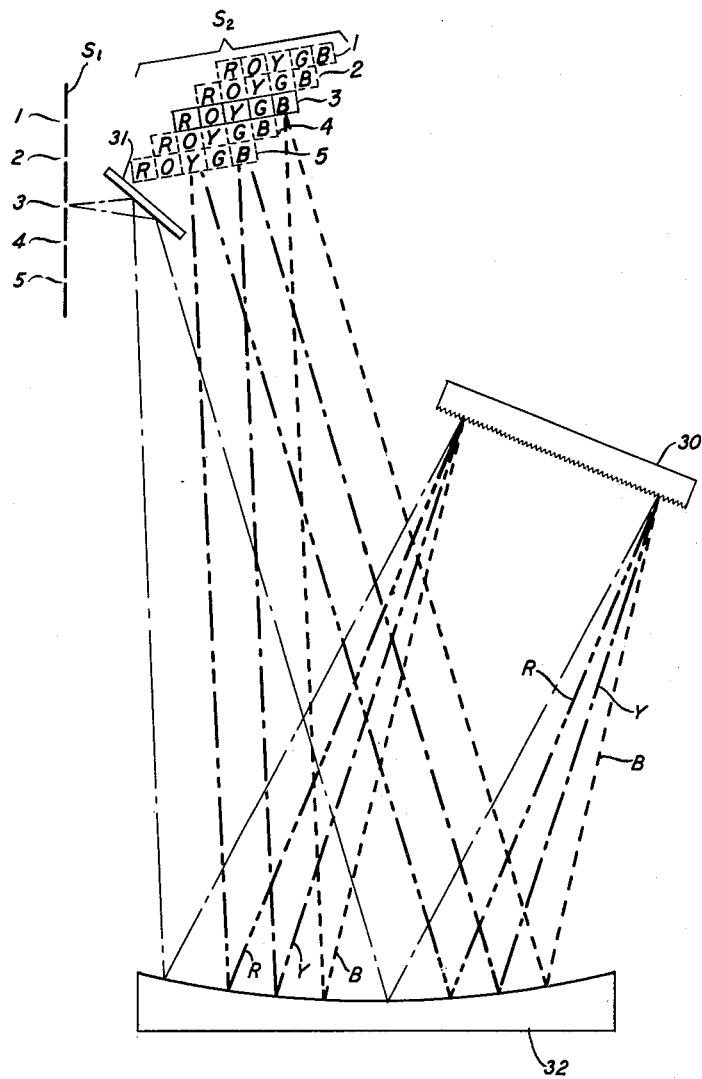

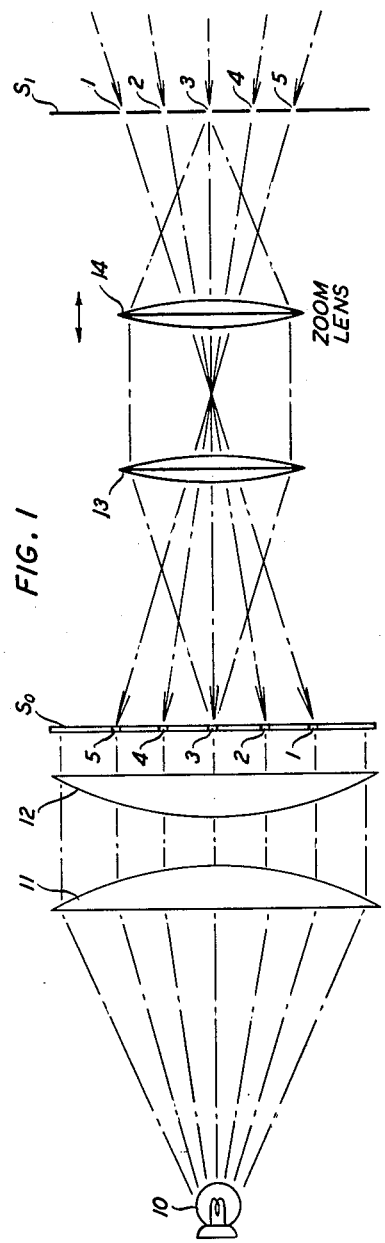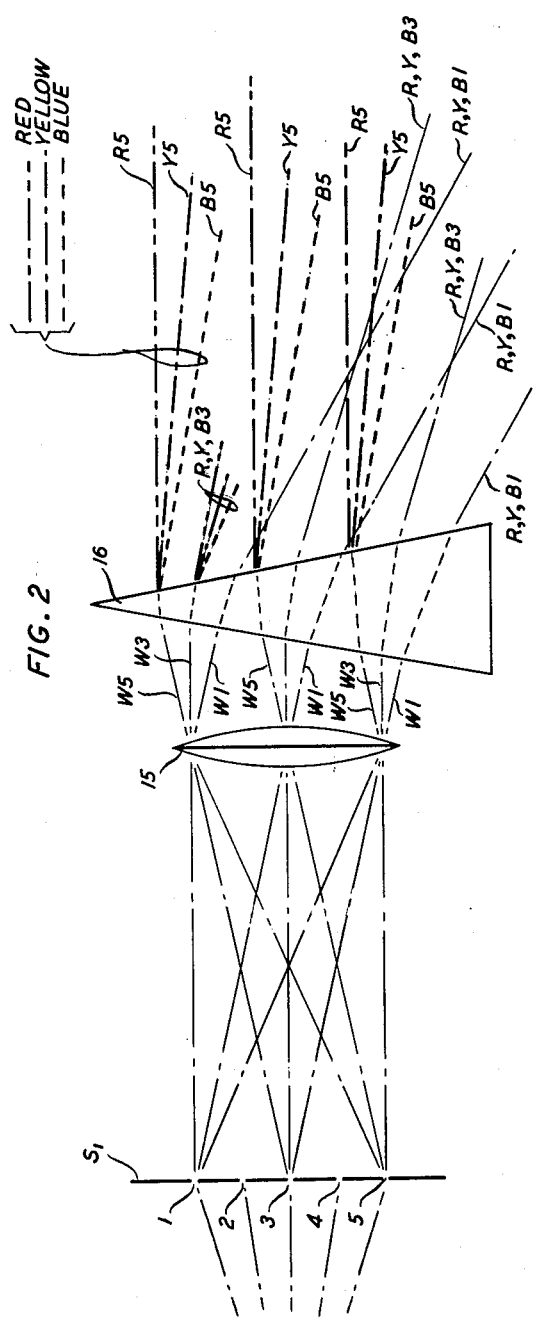

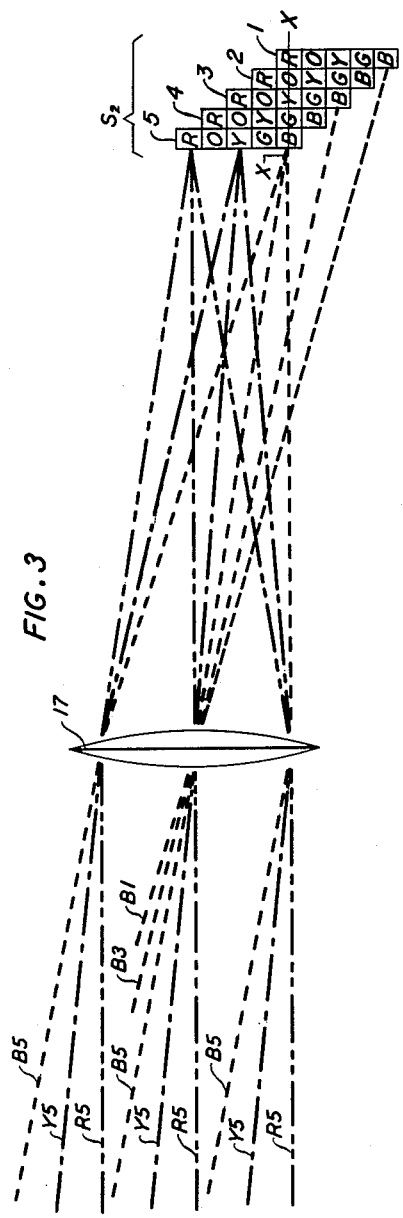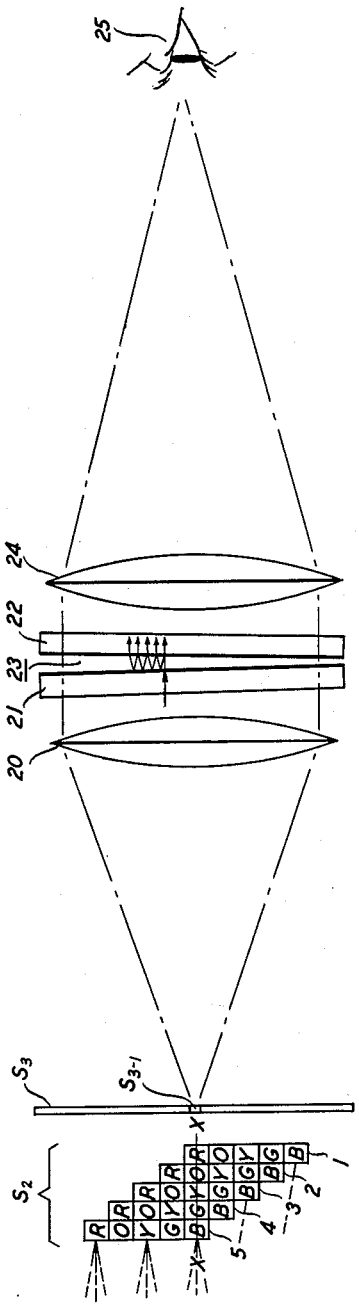

INVENTOR
D.R. HERRIOTT

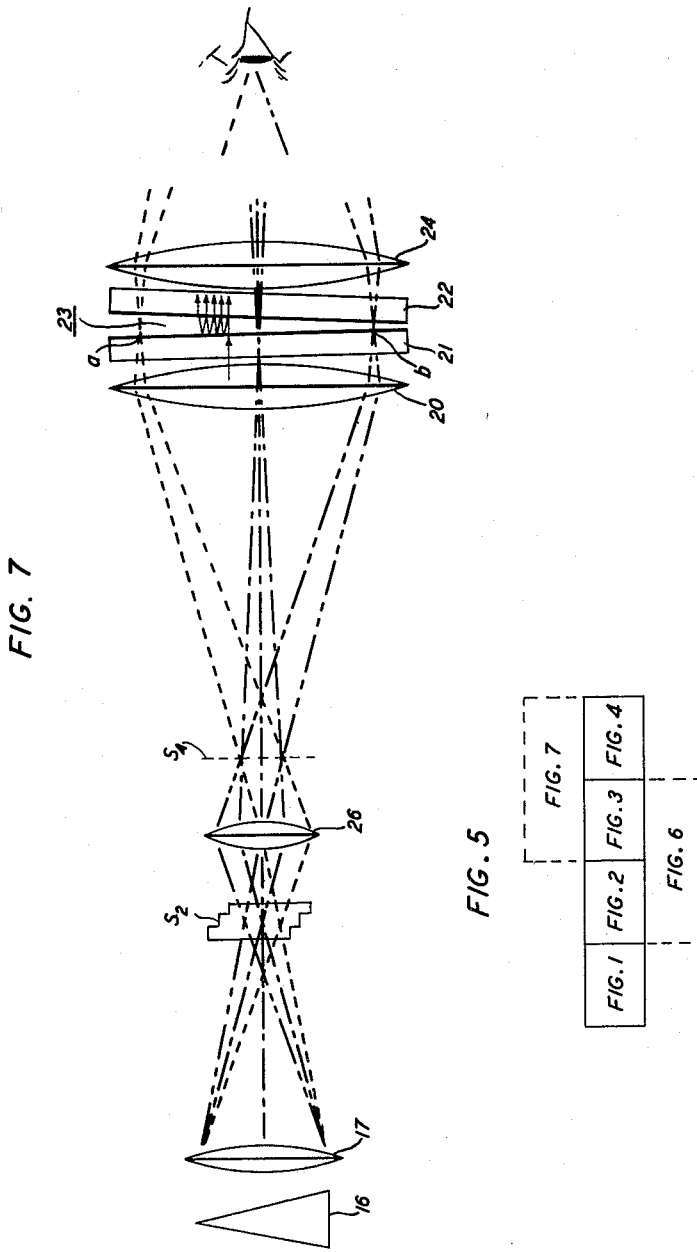

3,145,252
POLYCHROMATIC INTERFEROMETRY
Donald R. Herriott, Morris Township, Morris County, N.J., assignor to Bell Telephone Laboratories, Incorporated, New York, N.Y., a corporation of New York
Filed Feb. 21, 1961, Ser. No. 90,832
7 Claims. (Cl. 88—14)

This invention deals with the inspection of flat surfaces and the precise contour mapping of such surfaces through the observation, visual or photographic, of interference fringes on a surface under test.

Optical apparatus of many varities include elements having flat surfaces and, for best operation, it is important that each of these nominally flat surfaces be indeed flat in as nearly perfect a sense as it is possible to achieve. The attainment of such flatness normally requires a sequence of grinding and lapping steps with intervening steps of flatness inspection.

It is a commonplace that one of the most precise methods for inspecting a surface for flatness is by the observation of interference fringes formed when light is passed through the surface and through a flat reference surface disposed at a small "wedge" angle with respect to the surface under test. To obtain sharp fringes, it is customary to employ monochromatic light. This may be a single "line" of the radiation spectrum of an ionized gas, or it may be selected from white light by use of a monochromator; i.e., by first passing white light through a dispersive element which draws it out into a "rainbow" and then selecting a sufficiently narrow portion of the rainbow. In either case, and for illumination at normal incidence, the fringe spacing corresponds to a half wave length change in the spacing between the surface under test and the reference surface; i.e., two fringes appear for each single wavelength change in the intersurface spacing. On the assumption that the standard is perfectly flat, the pattern of fringes is thus a contour map of the surface under test. If the fringes are straight, and equally spaced, the surface under test is as flat as the reference surface. Bends in the fringes reveal departures of the surface under test from perfect flatness. This technique and the configuration of the resulting fringes are described in textbooks dealing with optical science generally, for example, "The Principles of Optics" by Arthur C. Hardy and Fred H. Perrin (McGraw-Hill 1932) page 577.

For inspection with the highest precision and sensitivity it is desirable to generate, for each wave length difference, a number of narrow fringes much greater than two, and with spacings between them corresponding to changes in spacing between the surfaces much less than a single wavelength of the incident light. This gives a greater fineness of contour mapping without increasing the wedge angle which would proportionately reduce the sensitivity of inspection. A greater number of fringes per wave length difference can be obtained by the simultaneous ultilization of several different spectral "lines." Five such lines are conveniently obtainable within the visible range with a mercury vapor lamp. Still more can be obtained with a mixture of ionized gases. However, the intensities of these lines vary widely from one line to another and their locations on the wave length scale, being determined by molecular energy level considerations, are not alike. The result is a contour map which is difficult to interpret.

The invention has as its final object the production of an interference fringe contour map of a flat surface in which the successive fringes are of substantially like intensities and appear, in the case of a perfect surface at substantially uniform intervals; that is to say, the contour scale of the map is substantially uniform. A more immediate object of the invention is the generation, from a source of white light, of a plurality of sharp spectral "lines" that are of substantially like intensities and are spaced with substantial uniformity on the wave length scale. These objects are attained, in accordance with the invention, in the following fashion.

The light from a source having a continuous band spectrum, e.g., the white light of an incandescent lamp, is gathered and directed onto an entrance shield that is pierced with an array of parallel $n$ slits. Each of these slits constitutes a secondary source of white light that is elongated in one direction and narrow in the perpendicular direction. After an intermediate processing step which, while not essential is highly advantageous, the light emerging from each of these slits is directed onto a dispersing element, e.g., a refracting prism or a diffraction grating, which draws it out into a rainbow of length $L$. The several rainbows are brought to focus in an image plane where they appear largely superposed but, because the slits of the shield are not coincident, the rainbows are staggered lengthwise. The magnitude of the stagger is small. Specifically, the displacement between each of the rainbows and the next one is not greater than $L/n$. Thus, at one end of the multiple rainbow image there appears only the red light originating at the slit at one end of the array while, at the other end of the image, there appears only the blue light originating in the slit at the other end of the array. Throughout a substantial portion of the image there appears light of various colors, one originating at each slit of the shield. While, due to the dispersion operation, color varies continuously from end to end of each rainbow image, it varies discontinuously from each rainbow to the next. Consequently, through any point near the center of the image pass rays of substantially like intensities and of discretely different colors, one for each slit of the entrance shield.

In accordance with a simple form of the invention, an exist shield is placed in this image plane, pierced by a single exit slit located near the center of the image. This slit selects, from the multiple rainbow image, a pencil of light consisting of $n$ components, one from each of the constituent rainbows. The pencil thus has a spectrum consisting of a plurality of discrete sharp lines, of substantially like intensities and, when the slits of the entrance shield are uniformly spaced, of nearly uniform distribution on the wave length scale. With a small and precalculated nonuniformity of the spacing of the slits in the entrance shield, the nonuniformity of dispersion introduced by the prism can be wholly compensated, in which case the spacing of the spectral lines on the wave length scale is completely uniform.

The pencil of light thus produced and having these characteristics may now be projected onto the surface under test, behind which lies the reference surface. The projected beam is collimated in the normal way so that interference effects may be manifested. Resulting interference fringes may be viewed or photographed by transmitted light or by reflected light as preferred in the customary fashion. The number of such fringes is substantially greater than results with the conventional monochromator. For example, with ten slits in the entrance shield, twenty fringes per wave length difference of spacing appear.

Passing allusion was made above to an advantageous intermediate processing step. This is to generate, before the dispersion operation, an intermediate real image of the secondary white light source consisting of the array of illuminated slits in the entrance shield. This real image can be generated by the use of a train of lenses of well known variety. The disposition of the elements of this train and the focal length of the combination is advantageously chosen in such a way that the image of the array of illuminated slits is greatly reduced in size, e.g., by a factor of five to ten. This permits the employment of an entrance shield having slits that are much too large and much too widely spaced for direct use in the generation of rays to be dispersed. Accordingly, the entrance shield itself may easily be constructed without resort to unduly fine workmanship. It is now the shield image which serves as the source of rays to be dispersed. Because the images of the several slits are exceedingly close together, the axes of the various cones of rays emerging from these slit images are very nearly parallel.

In accordance with a further feature of the invention, one subcombination of the lenses of this intermediate train is characterized by variable magnification, i.e., it is a so-called "zoom" lens. By operation of the control element of the zoom lens, the magnification of the shield slit images can be varied at will, and preferably in such a fashion that the bluest fringe of any particular interference order appears to fit nicely adjacent the reddest fringe of the next order. Thus the entire surface under test appears to be substantially filled with interference fringes of which the spacings are nearly uniform from side to side of the surface.

The single exit slit that follows the dispersing element must, if high fringe definition is desired, be so narrow that the variation of wave length along a single rainbow image from side to side of the slit shall be negligible. Such a narrow slit, however, restricts the total brilliance of each fringe to a level no greater than is obtainable with a conventional monochromator. While the total illumination of the surface under examination is of course increased by a factor equal to the number of slits in the entrance shield, the benefit of this increase appears in the increased number of fringes rather than in increased brilliance of any particular fringe.

It is therefore a further object of the invention to produce a substantial increase in the brilliance of the individual fringes without an offsetting reduction in their definition. This object is achieved, in accordance with a further modification of the invention, by removal of the exit shield and by replacement of this shield and its exit slit with a double-duty lens of which the focal length and disposition are proportioned in the following fashion. First, the lens is so placed that the plane containing the staggered multiple rainbow image lies just beyond its entrance focal point, so that the multiple rainbow image, or at least a substantial part of it, is itself imaged, through a collimator, on the surface under test. This imaging operation establishes a one-to-one correspondence between each elemental area of the surface under test and a corresponding narrow segment of the multiple rainbow image so that any specified portion of the surface receives light of $n$ discretely different colors, and no others. The $n$ colors incident on another portion of the surface under test differ, albeit very slightly, from those incident on the specified portion. This situation is to be contrasted with that which prevails when, as in the simpler modification earlier described, the selection of the $n$ discretely different colors is accomplished by a physical slit in the plane of the multiple rainbow image, the light passing through this slit being projected without imaging onto the surface under test, in which case the colors incident on each part of the surface are identical with those incident on every other part.

Advantageously, the imaging lens is so disposed that the multiple rainbow image lies only slightly beyond its entrance focal point. This makes for enlargement or magnification of the image formed on the surface under test as compared with the multiple rainbow image.

Second, and simultaneously, the lens is separated from the dispersing element by many times its focal length. It thus gathers all of the light that emerges from the dispersing element and brings it to a focus in an intermediate plane as a real image of the dispersing element, or of its exit lens, of greatly reduced size. Since all the rays of interest pass through this minute image, whose lateral dimensions may be as little as $\frac{1}{50}$–$\frac{1}{100}$ of the distance to the surface under test, collimation is achieved to an extent sufficient for the development of interference effects and the manifestation of sharp visible fringes.

At the same time, utilization of all or a large part of the light that emerges from the disperser, and hence of the multiple rainbow image, instead of a narrow segment of the latter defined by the color-selecting slit, enormously increases the total available light flux, at the cost only of the small point-to-point color difference mentioned above.

For most purposes, the consequences of this color difference are of no practical importance. When they are objectionable, they may be reduced by utilizing only the central portion, for example, two percent, of the multiple rainbow image; i.e., a segment of it which is sufficiently narrow to reduce the point-to-point color difference but yet much wider than the segment selected by the physical slit of the simpler form of the invention. If preferred, the consequences of the color difference may be compensated in various ways.

Moreover, the double-duty lens offers advantages, in certain circumstances, quite aside from the employment of multiple entrance slits or the generation of multiple rainbows.

The invention will be fully apprehended from the following detailed description of illustrative embodiments thereof taken in connection with the appended drawings in which:

FIGS. 1, 2, 3 and 4, combined as shown in FIG. 5, constitute a schematic ray diagram of one form of the invention;

FIG. 6 is a schematic ray diagram illustrating an alternative embodiment of the portion of the invention illustrated in FIGS. 2 and 3, as also indicated in FIG. 5; and FIG. 7 is a schematic ray diagram illustrating a modification of the portion of the invention illustrated in FIGS. 3 and 4, as also indicated in FIG. 5.

Referring now to the drawings, the white light of a source such as an incandescent lamp 10 is collected by a condenser lens 11, 12 and directed onto an entrance shield $S_0$ containing a number of slits $S_{0-1}$, $S_{0-2}$ . . . $S_{0-5}$ each of which is extended in a direction perpendicular to the plane of the drawing but is narrow in that plane. Each slit should be parallel with the other slits and, in the simplest embodiment, they may be uniformly spaced apart. As a refinement, a certain nonuniformity of spacing may be introduced among them to compensate for nonuniformities in the system. For purposes of illustration five such slits are shown although, as a practical matter, ten to twenty is a more suitable number.

Because of a refinement to be described the full length of the array of slits is not of primary importance. They may indeed embrace an area, for example, of about one square inch, the center-to-center spacing among the slits being about one tenth inch and their lengths being about an inch. The width of each slit may be about one-fifth of the center-to-center spacing between slits, so that the open area of all the slits together is about one fifth of the area of the entire array; i.e., twenty percent of the light reaching the shield from the condenser is passed while eighty percent of it is blocked.

Each slit of this entrance shield $S_0$ thus constitutes a secondary source of white light and its rays fall within a cone whose angle depends on the actual size of the white light source 10 and its distance from the $S_0$ shield. The cone angle is much exaggerated in the drawing.

The rays of white light emanating from the several slits $S_{0-1}$, etc. are brought to focus in a first image plane, designated $S_1$, by a train of lenses here illustrated simply as two like components 13, 14. One of these components 14, is preferably a "zoom" lens; i.e., a combination of elements to which coordinated axial movements may be imparted by operation of a control element in such a way that the image in the plane $S_1$ may be varied in magnification over a substantial range, i.e., a range of perhaps four or five to one. Furthermore, the focal lengths and dispositions of the elements of this lens combination 13, 14 are so chosen that the size of the image in the plane $S_1$ is reduced, by a factor of ten or so, as compared with the size of the secondary source array $S_0$. Thus the image may well comprise ten bright, parallel lines within the space of 1/10 inch.

The image plane $S_1$ is repeated at the left hand margin of FIG. 2 which shows rays diverging from the first, the third and the fifth of the five illustrative slit images $S_{1-1}$, $S_{1-2}$, etc. shown. These rays are passed through a collimator lens 15 which brings all the rays from any single slit into substantial parallelism, and onto a dispersive element, here shown for illustrative purposes as a prism 16. The prism 16 spreads each white light ray which it receives into a rainbow, bending the blue components the most, the red components the least and components of intermediate wave lengths, here illustrated as the yellow components, to intermediate extents. FIG. 2 shows red rays $R_5$, yellow rays $Y_5$ and blue rays $B_5$ emerging from different parts of the prism 16, having originated in the white light $W_5$ passing through the fifth slit image and through the upper part, the center, and the lower part of the collimating lens 15, respectively. Because of the collimation, the red rays $R_5$ are all parallel with each other, the yellow rays $Y_5$ are all parallel with each other and the blue rays $B_5$ are all parallel with each other. The figure also illustrates, in vestigial fashion, red, yellow, and blue rays $RYB_3$ originating in the third slit image and reaching the prism through the upper portion of the collimating lens. It indicates schematically a mean of red, yellow and blue rays $RYB_3$ and $RYB_1$ from the third and the first slit images, passing through the midpoint and through the lower portion of the collimating lens, respectively.

Turning to FIG. 3, the variously colored rays emerging from the prism of FIG. 2, along with many more rays, not shown, of different colors originating at different slit images and emerging from the prism in different directions, are passed through an achromatic lens 17 which brings them all into focus as rainbow images in a second image plane, designated $S_2$. Each single rainbow image is schematically shown as a box of individual colors. To avoid confusion of the drawing, the several rainbow images $S_{2-1}$, $S_{2-3}$, $S_{2-5}$ originating in the several slits $S_{0-1}$, ... $S_{0-3}$ ... $S_{0-5}$ of the entrance shield $S_0$ are shown side by side in the axial direction. It is to be understood, however, that with adequate correction of the lens 17 for chromatic aberration, these several images are in fact formed at the same distance from the lens 17 and hence in the single secondary image plane $S_2$. Because, however, of the fact that the rays enter the lens 17 from various directions, in dependence both on the color-dependent dispersion and on the identities of the various slit images $S_{1-1}$, etc. in which they originate, each of these superposed secondary images $S_{2-1}$, etc. has the form of a rainbow of which the color varies continuously from end to end, while the several rainbows are mutually staggered lengthwise, in a direction perpendicular to the axis of the system. Thus, at one end of the multiple rainbow image, here shown as the upper end, only the red portion $S_{2-5}$ (R) of the rainbow originating at the fifth slit appears, while at the opposite end there appears only the blue portion $S_{2-1}$ (B) of the rainbow originating in the first slit. In the central portion of the image, however, there appear distinct, individually colored portions of the several rainbows with no continuous gradation from each to the next. Thus, for example, at the point of the image indicated in the drawing by the line X—X, there appear together red light (R) from the first slit, orange light (O) from the second slit, yellow light (Y) from the third slit, green light (G) from the fourth slit, and blue light (B) from the fifth slit. The light diverging from this point has thus been treated as by a comb filter; its spectrum consists of a number of discrete sharp "lines" with no light of intervening wave lengths; in the illustration, five such lines, one due to each slit of the entrance shield.

The slit image $S_2$ of the right hand portion of FIG. 3 is repeated in greater detail at the left hand portion of FIG. 4 from which it plainly appears that, at the point illustrated by the line X—X, rays are present of red light (R) from the first slit, orange light (O) from the second slit, yellow light (Y) from the third slit, green light (G) from the fourth slit, and blue light (B) from the fifth slit. Evidently the number of different rainbows that are thus superposed in staggered fashion is identical with the number of slits in the entrance shield $S_0$. Thus, with ten slits instead of the five shown and with the same total spacing from the first to the last, light of ten discretely different wave lengths is present at the point X—X.

An exit shield $S_3$, shown for the sake of clarity to the right of this second image plane $S_2$ is, in fact, disposed in the image plane. It is provided with an exit slit $S_{3-1}$ located at the point X—X. Hence, rays of these discretely different wave lengths and no others emerge from the exit slit $S_{3-1}$. These rays are passed through a collimator 20 onto the surface of a plate 21 being tested for flatness. In accordance with the well known principle of interference fringe techniques a reference plate 22, ideally one with a perfectly flat surface, is placed immediately behind the plate 21 under test and at a small "wedge" angle 23 with respect to it. Interference fringes are then developed by virtue of this wedge angle. These may be viewed or photographed, as preferred either by reflected light or, as shown, by transmitted light. To this end, the rays emerging from the rear face of the reference plate 22 are brought into convergence by a lens 24 so that they may be viewed by an observer whose eye 25 is shown at the right hand margin of the drawing.

With the arrangement of FIG. 4 the rays reaching the various parts of the collimating lens 20 from various directions all pass through the aperture $S_{3-1}$ and hence they all originate in the same narrow segment of the multiple rainbow image. Thus the $n$ discretely different wavelengths incident on any part of the surface are the same as those incident on any other part of the surface. With rainbow images of which the dispersion is independent of wavelength, as obtainable, for example, when the disperser is a grating, the interference fringes are accurately representative of the true contours. With a prism they are very nearly so. But this accuracy is secured only at the sacrifice of intensity of illumination, since the light originating in a single narrow segment of the multiple rainbow image is distributed over the entire surface of the plate 21 and must be shared by all of its parts.

Operation of the control element, not shown, of the zoom lens 14 of FIG. 1 varies the magnification of the slit images $S_1$ as compared with the entrance slit array $S_0$, and hence the amount of stagger among the multiple rainbow images $S_2$. In this way the entire area of the surface viewed may be caused to appear to be filled with interference fringes, the bluest fringe of each order lying snugly adjacent the reddest fringe of the next order. Hence the initial lens train 13, 14, with its zoom lens 14, offers a decided advantage. It is not, however, essential. If preferred, the white light passing through the arrayed slits of the entrance shield $S_0$ may be directed immediately upon the dispersing element, staggered multiple rainbow images being then formed by the apparatus of FIG. 2. In such case resort may be had to other means for causing the final fringe pattern to fill the area of the surface under inspection.

In accordance with well known principles, the dispersing element, represented in FIG. 2 as a prism 16 may, if preferred, be a diffraction grating, either of the reflecting variety or of the transmitting variety. If a transmission grating, it may replace the prism of FIG. 2 without other change. If a reflecting grating 30, it may be arranged, in combination with a plane mirror 31 and a spherical mirror 32, as shown in FIG. 6 to replace the less compact but equivalent apparatus of FIGS. 2 and 3, to produce similar multiple rainbow images, one for each of the white light slit images $S_1$. To avoid excessive complexity of the drawing, only one set of rays, originating at a single slit image, the third one, of the set of slit images $S_1$ are shown. The entire multiple rainbow image $S_2$ is schematically indicated.

The intermediate focusing system of FIG. 1 and the variable magnification element 14 which forms a part of it are as advantageous in the modification of FIG. 6 as in that of FIGS. 1–4, but no more essential. If desired, it may be dispensed with, in which case the light source for the modification of FIG. 6 may be regarded as the slitted entrance shield $S_0$ in place of the multiple slit image $S_1$.

The exit slit $S_{3-1}$ in the shield $S_3$ of FIG. 4 must be so narrow that the continuous variation of wave length of the rays from any single one of the input slits across its width is negligible. Such a narrow slit inevitably restricts the total light flux available for generation of the interference fringes and hence the brilliance of each fringe. In accordance with a modification of the invention shown in FIG. 7, the exit shield $S_3$ with its narrow slit is removed and replaced by a lens 26 that is proportioned and disposed to satisfy the following conditions. First, it images the multiple rainbow $S_2$ of FIG. 3, or a substantial part of it, through the collimator 20 and onto the surface of the plate 21 under test, and does so with substantial enlargement. Second, this same lens 26 forms, in an intermediate plane $S_4$, an image of the aperture of the dispersive element, here illustrated as the achromatic lens 17 of FIG. 3 that follows the prism 16 of FIG. 2, and this image is of very small area compared with the aperture lens 17 as an object. This dual performance is accomplished by proportioning the lens 26 itself and the various distances at which the lens 26, the aperture 17, the plane of the second image $S_2$, the third image plane $S_4$ and the surface of the element 21 under test are placed with respect to it in such a way that the multiple rainbow image $S_2$ lies slightly to the left of the entrance focal point of the lens 26 while the aperture 17 of the dispersive element 16 lies many focal distances to the left of the lens 26. With this arrangement, the third image plane $S_4$ appears very slightly to the right of the exit focal point of the lens 26 and the image of the aperture lens 17 of the dispersive element 16 is greatly diminished in size while, at the same time and as stated above, the images on the surface 21 under test of the multiple rainbows $S_2$ are considerably magnified.

With this arrangement, all of the useful light, namely all of the light emerging from the aperture lens 17 of the dispersive element 16 passes through a figurative aperture in the third image plane $S_4$ that is very minute. Indeed, it may be as small as two millimeters in diameter. The collimating lens 20 is disposed close to the surface 21 under test with its entrance focal point located in the plane of this third image $S_4$. With a distance of the order of 30 centimeters separating the lens 26 from the surface under test, this figurative aperture, which constitutes the entrance pupil for the remainder of the system subtends an angle of only about one half degree at that surface. Hence, collimation of a quality sufficient to insure high contrast between each fringe and its background and hence high definition of the contour-defining fringes is assured. At the same time, a flux of light from the multiple rainbows $S_2$ that is far in excess of the flux passing through the exit slit $S_{3-1}$ of FIG. 4 is gathered by the lens 26 of FIG. 7 and turned to account, rays from different parts of the multiple rainbow image being incident on different parts of the surface under test. Thus is achieved greatly increased illumination of the element 21 under test and, in proportion, improved contrast between fringes and background without a loss of definition which would be the consequence of a comparable enlargement of the exit slit $S_{3-1}$ of FIG. 4.

As above pointed out, within the fringe pattern of any specified order the several fringes that appear arise from the several rainbow images in the plane $S_2$, each one being due to interference effects between waves of a specified wave length, while these wave lengths differ from fringe to fringe.

Circumstances may arise, especially in connection with quantitative measurement in contrast to contour mapping, in which it suffices to generate these different wave length fringes in temporal succession instead of simultaneously. This can readily be achieved with a monochromator having a single slit in its entrance shield, thus generating a single rainbow image and, instead of the single exit slit $S_{3-1}$ of FIG. 4, the double-duty lens of FIG. 7, proportioned and disposed to focus a narrow-band part of this resulting single rainbow on the sample to be inspected and, at the same time, to focus the dispersive element into a minute image in an intermediate plane. By rocking the dispersive element about an axis at right angles to the average direction of the light rays emerging from it, the rainbow image may be caused to sweep across the double-duty lens 26. Thus the portion of the rainbow that is selected by the double-duty lens 26 can be altered at will; and for each such selected wave length, each resulting fringe appears at a different part of the area of the surface under test. Thus, controlled movement of the dispersive element 16 with respect to the exit slit causes migration of the fringe pattern across the surface under test.

Schemes will suggest themselves to those skilled in the art by which the invention may be modified without alteration of its central themes for the inspection of curved surfaces, e.g., cylindrical, spherical, parabolic or others. Additionally, while the invention is of present use principally in the generation of light rays having spectra of a character that renders them peculiarly suitable for inspection and test of surfaces by the method of interference fringes, other uses will suggest themselves to those skilled in the art.

What is claimed is:

1. In a system for the inspection of a flat surface by the method of interference fringes, the combination which comprises an incandescent lamp, an opaque shield, pierced by an aperture, interposed in the path of the light of said lamp and illuminated thereby, a common element for dispersing light rays that emerge from said aperture, means for focusing said dispersed rays into a continuous rainbow image in an image plane, and means for selecting, for projection toward each single element of said surface, essentially monochromatic light rays from essentially a single point of said image, said selecting means comprising a lens having a preassigned focal length, said lens being so disposed in the path of light emanating from said rainbow image and at a distance therefrom slightly in excess of its entrance focal distance, as to form on the surface under inspection an image that is substantially magnified as compared with said rainbow image, said lens also being disposed at a distance from said dispersive element several times greater than said entrance focal distance, whereby, simultaneously, said lens forms an image of said dispersive element in a plane located between said lens and said surface and at a distance from said lens that is slightly in excess of its exit focal distance, whereby said last-named image constitutes an entrance pupil, for light impinging on said surface, of a size sufficiently small to permit collimation of said light, and a reference surface optically related to said first defined surface for the generation of fringes of high definition.

2. In a system for the inspection of a flat surface by the method of interference fringes, the combination which comprises a lamp constructed to radiate white light, an opaque shield disposed in a plane normal to the path of the light of said lamp, said shield being pierced by $n$ elongated slits, illuminated by said light, and thus constituting individual white light sources, said slits being disposed parallel with each other and spaced apart in a direction normal to their long dimensions, a common element for dispersing, in a direction normal to the long dimensions of the slits, light rays that emerge from all of the slits, means for focusing the dispersed rays in a second plane, thus to form a multiple rainbow image constituted of $n$ like, continuous, partially superposed, similarly oriented rainbows, each of length L in the dimension normal to the long dimensions of the slits, the spacings among the several slits being so coordinated with the dispersive power of the dispersing element that said rainbows are mutually staggered in the direction of their lengths by distances no greater than $L/n$, whereby at each point of said multiple rainbow image, only $n$ discretely different light wavelengths appear, one from each of the several constituent rainbows, means for selecting, for projection toward each single element of the surface under test, light rays from essentially a single point of said multiple rainbow image, including an essentially monochromatic segment of each of said rainbows, a reference surface disposed in optical relation to said flat surface, and means for directing said selected light rays onto both of said surfaces, thereby to develop a set of interference fringes that are representative of the geometrical contours of said flat surface.

3. In combination with apparatus as defined in claim 2, a train of optical elements disposed between said shield and said dispersing element for forming, in an intermediate plane, real images of said slits as illuminated by said source, said real images thus constituting an array of secondary white light sources, said train of elements being characterized by variable magnification, whereby the stagger among the constituent rainbows of the multiple rainbow image may be adjusted to produce desired interfringe intervals.

4. Apparatus as defined in claim 2 wherein the selecting means comprises an opaque shield disposed in the plane of said multiple rainbow image and pierced by a single aperture of a width such that the wavelength variation from side to side thereof is insubstantial, whereby the $n$ discretely different wavelengths of the rays incident on the surface under test are invariant over said surface.

5. Apparatus as defined in claim 2 wherein said selecting means comprises a lens disposed in the path of the light rays emerging from said multiple rainbow image and at a distance therefrom slightly in excess of its local length, said lens being proportioned to form on the surface under test an image of said multiple rainbow image, whereby there is established a one-to-one correspondence between the pattern of colors incident on each single elemental area of said surface and those available at a corresponding single point of said multiple rainbow image.

6. Apparatus as defined in claim 5 wherein said dispersing means is spaced apart from said multiple rainbow image by many times the focal length of said lens, whereby said lens forms an image of said dispersing element in a plane located between said lens and the surface under test and slightly beyond its exit focal point, said last-named image thus constituting an entrance pupil, for light incident on said surface, of a size sufficiently small to permit collimation of said light to a degree suitable for the development of interference fringes of high definition.

7. Apparatus for illuminating each elemental area of a surface with essentially monochromatic light, the color of said light varying progressively in one direction across the surface, which comprises, in combination, a source of light, an opaque shield, pierced by an aperture, interposed in the path of the light of said source and illuminated thereby, a common element for dispersing light rays that emerge from said aperture, means for focusing said dispersed rays into a continuous rainbow image in an image plane, and means for selecting, for projection toward each single element of said surface, essentially monochromatic light rays from essentially a single point of said image, said selecting means comprising a lens having a preassigned focal length, said lens being so disposed in the path of light emanating from said rainbow image and at a distance therefrom slightly in excess of its entrance focal distance, as to form on the illuminated surface an image that is substantially magnified as compared with said rainbow image, said lens also being disposed at a distance from said dispersive element several times greater than said entrance focal distance, whereby, simultaneously, said lens forms an image of said dispersive element in a plane located between said lens and said surface and at a distance from said lens that is slightly in excess of its exit focal distance, whereby said last-named image constitutes an entrance pupil, for light incident on said surface, of a size sufficiently small to permit substantial collimation of said incident light, and means associated with said first defined surface for producing a set of interference fringes.

References Cited in the file of this patent
UNITED STATES PATENTS

| | | |
|---|---|---|
| 1,455,825 | Wood | May 22, 1923 |
| 1,601,358 | Hall | Sept. 28, 1926 |
| 1,709,809 | Rashevsky | Apr. 16, 1929 |
| 2,206,521 | Van Den Akker et al. | July 2, 1940 |
| 2,453,164 | Swings | Nov. 9, 1948 |
| 2,813,146 | Glenn | Nov. 12, 1957 |
| 2,867,148 | Svensson | Jan. 6, 1959 |